Feb. 24, 1959
K. E. FARR
2,875,274
TELEVISION RECEIVER APPARATUS
Filed Oct. 7, 1953
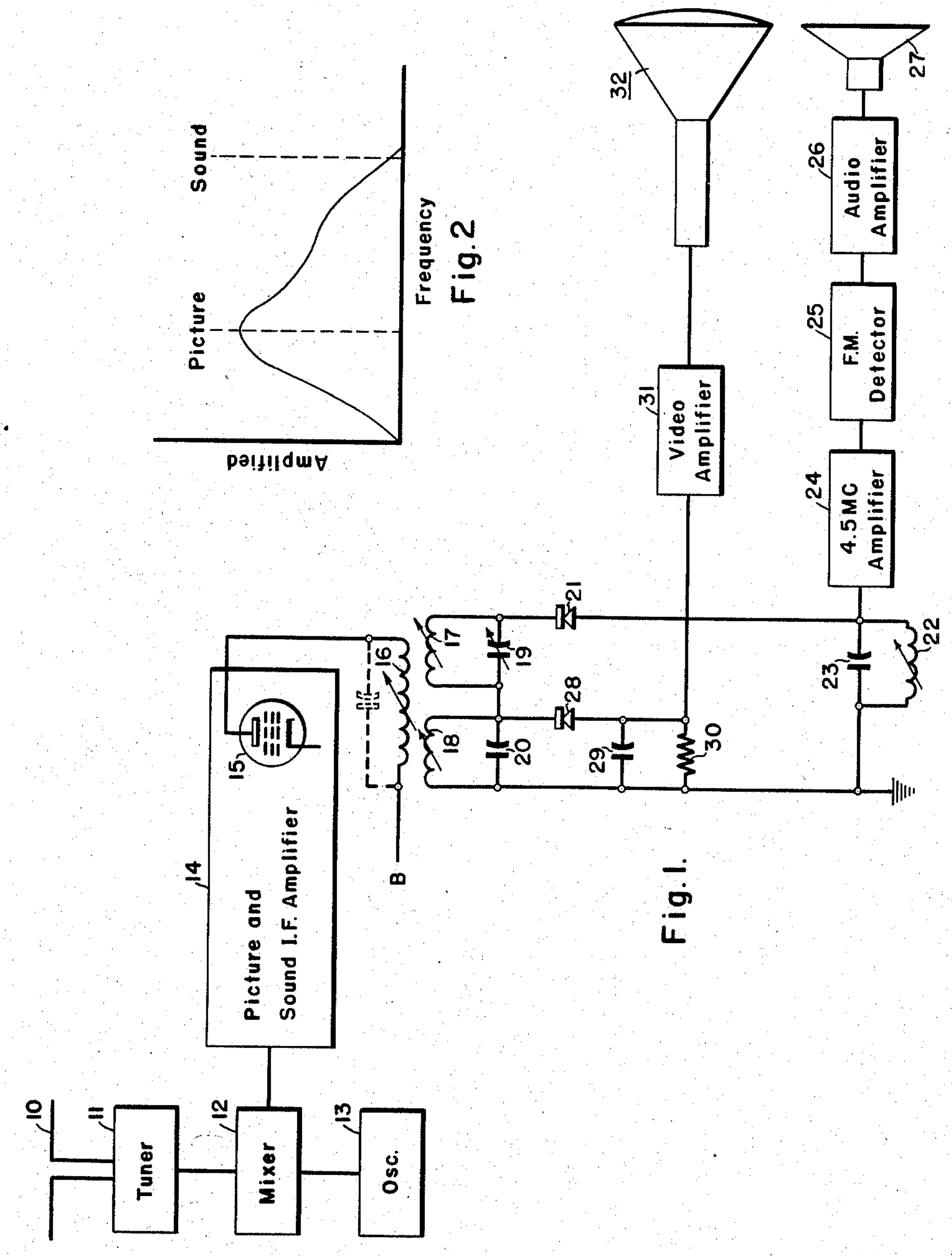
Fig. 2, Fig. I.
WITNESSES
John E. Healy
R. G. Brodahl
INVENTOR
Kenneth E. Farr.
BY
F. E. Browder
ATTORNEY

United States Patent Office 2,875,274

Patented Feb. 24, 1959

2,875,274

TELEVISION RECEIVER APPARATUS

Kenneth E. Farr, Paxinos, Pa., assignor to Westinghouse Electric Corporation, East Pittsburgh, Pa., a corporation of Pennsylvania

Application October 7, 1953, Serial No. 384,700

8 Claims. (Cl. 178—5.8)

This invention relates to television receivers of the type having inter-carrier sound systems, and has as an object to improve the performance of such sound systems.

In a television receiver having an inter-carrier sound system, both the picture and sound intermediate frequency carriers are amplified in a common I. F. amplifier and applied to the video detector. The video signal obtained by demodulation at the video detector, of the picture carrier, is amplified in a video amplifier and applied to the cathode ray picture tube. A sound second I. F. of 4.5 megacycles which is a modulation product of the picture and sound first intermediate frequencies, is usually taken from the anode of the first amplifier tube of the video amplifier, amplified in a sound second I. F. amplifier, and supplied to a frequency modulation detector.

While such an inter-carrier sound system has many well known advantages, its performance is considerably poorer than that theoretically possible for frequency modulation sound systems. This is largely due to the fact that the 4.5 megacycle beat between the picture and sound first I. F. carriers is amplitude modulated with picture and synchronization (hereinafter referred to as sync) information and added noise components which will be beat down into the audible range unless a definite large ratio of picture carrier amplification to sound carrier amplification is maintained.

It has been observed, particularly in fringe reception areas, that signal to noise varies as a function of video modulation. In current television broadcast practice, the picture carrier signal which is maximum during the transmission of the sync pulse, has a very low value during transmission of the white portions of a picture. In fringe reception areas, a very strong sound carrier and a weak picture carrier may be received so that the picture-to-sound ratio may be too small so that the 4.5 megacycle component will be more subject to amplitude modulation always present on the picture carrier.

My invention improves the performance of an inter-carrier sound system by increasing the picture I. F. carrier to sound first I. F. carrier ratio, more specifically by increasing the picture I. F. carrier amplitude without correspondingly increasing the amplitude of the sound first I. F. carrier.

In one embodiment of my invention, a sound second detector independent of the video detector is used for producing the 4.5 megacycle beat from the picture and sound first I. F. amplifier, and has an input circuit inductively coupled to the output stage of the I. F. amplifier, and containing two series connected coils, one of which is responsive to the entire frequency band including the sound first I. F. carrier, and the other responsive to a narrow band of frequencies around the picture I. F. carrier and which is sharply tuned to the picture I. F. carrier for providing as much gain as is possible at the picture I. F. resulting in an increased picture carrier to sound carrier ratio at the sound second detector.

Another object of my invention is to increase the picture I. F. carrier to sound I. F. carrier ratio in a television receiver.

Another object of my invention is to amplify the picture I. F. carrier without correspondingly amplifying the sound first I. F. carrier in a television receiver.

My invention will now be described with reference to the drawings, of which:

Figure 1 is a diagrammatic view of a television receiver embodying the invention; and Fig. 2 is a picture I. F. and sound first I. F. response curve as seen by the sound take-off detector of Fig. 1.

The television signals from the antenna 10 are passed through the tuner or station selector 11 and then into the mixer or first detector 12 where they are beat with the output of the oscillator 13 to provide a picture I. F. and a sound first I. F. which are amplified in the common I. F. amplifier 14.

In accordance with the present invention, less sound trapping than usual may be used if desired for better sound performance. The output tube 15 of the I. F. amplifier 14, has its anode connected to the primary coil 16 of an inductive coupler having the series connected secondary coils 17 and 18. The coupling between the coils 16, 17 and 18 is adjustable.

The coil 17 is sharply tuned by the variable capacitor 19 connected in parallel with it, to the picture I. F. for providing as much gain as possible. The coil 18 having the capacitor 20 shunted thereacross, is releatively broadly tuned to the entire frequency band including the sound first intermediate frequency. The sound detector 21 is connected in series with the inductor 22 which is shunted by the capacitor 23, and the coils 17 and 18. The words sharply and broadly are used relative to the picture intermediate frequency spectrum (picture carrier plus video sidebands).

The sound detector 21 sees a picture and sound carrier response curve similar to that of Fig. 2 of the drawings, in which the picture-to-sound ratio is greatly increased over that seen by the video detector of the usual inter-carrier system. The 4.5 megacycle modulation product of the picture and sound first I. F. carriers is generated and taken off at an amplified level by the detector 21, and supplied through the inductor 22 tuned to the 4.5 megacycle second sound I. F. to the sound second I. F. amplifier 24, the output of which is connected to the FM detector 25, which is connected through the audio amplifier 26 to the loud speaker 27.

The video detector of the receiver can be connected as usual to the output of the I. F. amplifier 14, with the diode 28 connected in series with the coil 18 and the input circuit of the video amplifier 31. The picture tube 32 is connected to the output of the video amplifier 31. The load capacitor 29 and resistor 30 are connected across the input to the amplifier 31.

Since the picture-to-sound ratio at the sound take-off detector is greatly increased over that of a conventional inter-carrier system, there is much less chance of the amplitude modulated components always present on the picture carrier, appearing on the 4.5 megacycle component used for sound reception. A stronger sound signal than usual may also result depending upon the sound trapping employed, since the 4.5 megacycle component has a higher level than in the usual system.

I claim as my invention:

1. A television receiver comprising a common picture and sound first intermediate frequency amplifier, a first inductor connected to said amplifier, a second inductor inductively coupled to said first inductor, a third inductor inductively coupled to said first and second inductors, means for tuning said second inductor relatively sharply to the picture intermediate frequency, means for tuning said third inductor relatively broadly to the picture intermediate frequency, so as to include the sound first intermediate frequency, a detector, a fourth inductor, means connecting said second and third inductors, said detector and said fourth inductor in series, said detector being operable to produce a sound second intermediate frequency which is a modulation product of the picture and sound first intermediate frequencies, means for tuning said fourth inductor to the sound second intermediate frequency, and a sound second intermediate frequency amplifier connected to said fourth inductor.

2. A television receiver comprising a common picture and sound first intermediate frequency amplifier, an inductive coupling having a primary winding connected to said amplifier and having a pair of serially connected secondary windings, means for tuning one of said secondary windings relatively sharply to the picture intermediate frequency, means for tuning the other of said secondary windings relatively broadly to the picture intermediate frequency so as to include the sound first intermediate frequency, a detector connected in series with said secondary windings operable to produce a sound second intermediate frequency which is a modulation product of the picture and sound first intermediate frequencies, an inductor connected to the output side of said detector, means for tuning said inductor to the sound second intermediate frequency, and a sound second intermediate frequency amplifier connected to said inductor.

3. A television receiver comprising a common picture and sound first intermediate frequency amplifier, an inductive coupling having a primary circuit connected to said amplifier and having a secondary circuit including a pair of serially connected inductors, one of said inductors being relatively sharply tuned to the picture intermediate frequency, the other of said inductors being relatively broadly tuned to the picture intermediate frequency so as to include the sound first intermediate frequency, and a detector in said secondary circuit connected in series with said inductors for producing a sound second intermediate frequency which is a modulation product of the picture and sound first intermediate frequencies.

4. A television receiver comprising a common picture and sound first intermediate frequency amplifier, an inductive coupling having a primary circuit connected to said amplifier and having a secondary circuit including a pair of serially connected inductors, one of said inductors being relatively sharply tuned to the picture intermediate frequency, the other of said inductors being relatively broadly tuned to the picture intermediate frequency so as to include the sound first intermediate frequency, and a detector in said secondary circuit connected in series with said inductors for producing a sound second intermediate frequency which is a modulation product of the picture and sound first intermediate frequencies, said secondary circuit further including a third inductor tuned to the sound second intermediate frequency, and a sound second intermediate frequency amplifier connected to said third inductor.

5. A television receiver comprising means for producing a picture and sound first intermediate frequency contained within a predetermined television signal frequency band, a common picture and sound first intermediate frequency amplifier, an inductive coupling having a primary winding connected to said amplifier and having a pair of serially connected secondary windings, means for tuning one of said secondary windings broadly to said frequency band, means for tuning the other of said secondary windings sharply to the picture intermediate frequency, a detector, and means connecting said secondary windings in series with said detector, said detector being operable to produce a sound second intermediate frequency which is a modulation product of the picture and sound first intermediate frequency.

6. A television receiver comprising means for producing a picture and sound first intermediate frequency contained within a predetermined television signal frequency band, a common picture and sound first intermediate frequency amplifier, an inductive coupling having a primary winding connected to said amplifier and having a pair of serially connected secondary windings, means for tuning one of said secondary windings broadly to said frequency band, means for tuning the other of said secondary windings sharply to the picture intermediate frequency, a detector, means connecting said secondary windings in series with said detector, said detector being operable to produce a sound second intermediate frequency which is a modulation product of the picture and sound first intermediate frequencies, an inductor connected to the output side of said detector, means for tuning said inductor to the sound second intermediate frequency, and a sound second intermediate frequency amplifier connected to said inductor.

7. A television receiver comprising means for producing a picture and sound first intermediate frequency, a common picture and sound first intermediate frequency amplifier, an inductive coupling having a primary winding connected to said amplifier and having a pair of secondary windings, means for tuning one of said secondary windings relatively sharply to the picture intermediate frequency, means for tuning the other of said secondary windings relatively broadly to the picture intermediate frequency so as to include the sound first intermediate frequency, and means connecting said secondary windings to a detector, said detector and said secondary windings being connected in series, with said detector being operable to produce a sound second intermediate frequency which is a modulation product of the picture and sound first intermediate frequencies.

8. A television receiver comprising means for producing a picture and sound first intermediate frequency, a common picture and sound first intermediate frequency amplifier, a first inductor connected to said amplifier, a second inductor inductively coupled to said first inductor, a third inductor inductively coupled to said first and second inductors, means for tuning said second inductor relatively sharply to the picture intermediate frequency, means for tuning said third inductor relatively broadly to the picture intermediate frequency so as to include the sound first intermediate frequency, and means connecting said second and third inductors to a detector, said detector and said second and said third inductors being connected in series, with said detector being operable to produce a sound second intermediate frequency which is a modulation product of the picture and sound first intermediate frequencies.

References Cited in the file of this patent

UNITED STATES PATENTS 2,448,908 Parker ---------------- Sept. 7, 1948

FOREIGN PATENTS 527,602 Great Britain ---------- Oct. 11, 1940